(12) United States Patent
Bentzinger et al.

(10) Patent No.: US 10,337,225 B2
(45) Date of Patent: Jul. 2, 2019

(54) ROLLER FOR A ROLLER DOOR AND METHOD FOR MOUNTING A ROLLER

(71) Applicant: Manfred Bauszus, Arnsberg (DE)

(72) Inventors: Philipp Bentzinger, Steinhagen (DE); Milto Benjamin, Guetersloh (DE)

(73) Assignee: Manfred Bauszus, Anrsberg (DE)

( * ) Notice: Subject to any disclaimer, the term of this patent is extended or adjusted under 35 U.S.C. 154(b) by 0 days.

(21) Appl. No.: 15/846,346

(22) Filed: Dec. 19, 2017

(65) Prior Publication Data

US 2018/0179797 A1    Jun. 28, 2018

(30) Foreign Application Priority Data

Dec. 22, 2016 (DE) .......................... 10 2016 125 512

(51) Int. Cl.
*E05D 15/00* (2006.01)
*A47H 15/00* (2006.01)
*E05D 15/16* (2006.01)
*F16C 13/00* (2006.01)
(Continued)

(52) U.S. Cl.
CPC .............. *E05D 15/165* (2013.01); *F16C 3/02* (2013.01); *F16C 13/006* (2013.01); *F16C 19/06* (2013.01); *E05Y 2201/688* (2013.01); *E05Y 2900/106* (2013.01); *E05Y 2900/132* (2013.01); *F16C 2208/00* (2013.01); *F16C 2220/04* (2013.01);
(Continued)

(58) Field of Classification Search
CPC ............... Y10T 16/364; Y10T 16/3825; Y10T 16/3837; Y10T 16/384; E05D 15/65; E05D 15/24; E05D 15/242; E05D 13/1261; F16C 13/006; F16C 13/02; F16C 13/022; F16C 2350/54; E05Y 2201/688; E05Y 2201/706; E05Y 2900/106; E05Y 2900/132; E05Y 2800/674; E05Y 2800/676
See application file for complete search history.

(56) References Cited

U.S. PATENT DOCUMENTS 2,492,055 A * 12/1949 Moritz ............... D01D 10/0454
                                                             242/366
2,525,309 A * 10/1950 Norberg ................ E05D 15/165
                                                             16/104
(Continued)

FOREIGN PATENT DOCUMENTS

DE         26 20 076 C3      1/1979
DE         600 14 241 T2     2/2006
(Continued)

*Primary Examiner* — Chuck Y Mah
(74) *Attorney, Agent, or Firm* — Collard & Roe, P.C.

(57) ABSTRACT

A roller for a roller door has a roller bearing surrounded by a roller on the outer circumference and into which a bearing pin is inserted on the inner circumference, which protrudes in the axial direction from the roller bearing. The bearing pin has an inner part of a harder material and a bearing sleeve made of a softer material, wherein the inner part is pressed or screwed into the bearing sleeve. A method for mounting a roller includes injection molding a bearing sleeve made of plastic, inserting and/or screwing an inner part into an inner ring of a roller bearing and the bearing sleeve, and fixing the inner part to the bearing sleeve in a force-locked manner, and applying a roller to an outer ring of the roller bearing.

10 Claims, 5 Drawing Sheets

(51) Int. Cl.
  *F16C 3/02*  (2006.01)
  *F16C 19/06*  (2006.01)

(52) U.S. Cl.
  CPC ...... *F16C 2350/52* (2013.01); *F16C 2350/54* (2013.01)

(56) References Cited

U.S. PATENT DOCUMENTS

| | | | | |
|---|---|---|---|---|
| 2,805,107 A * | 9/1957 | Van De Warker | .... | E05D 15/063 384/449 |
| 4,306,756 A * | 12/1981 | Whiting | ........ | F16C 13/006 16/107 |
| 4,379,479 A * | 4/1983 | Whiting | ........ | B60J 5/08 16/97 |
| 4,953,257 A | 9/1990 | Seynhaeve | | |
| 5,208,935 A * | 5/1993 | Jailor | ........ | A47L 11/33 15/41.1 |
| 5,447,377 A * | 9/1995 | Baumgartner | ........ | F16C 13/006 384/477 |
| 5,792,033 A | 8/1998 | Merrithew | ........ | A63B 21/023 384/19 |
| 6,185,783 B1 * | 2/2001 | Carpinella | ........ | E05D 15/165 16/107 |
| 6,357,926 B1 | 3/2002 | Hauck et al. | | |
| 6,494,622 B2 * | 12/2002 | Plesh, Sr. | ........ | B65G 39/20 384/542 |
| 6,536,077 B1 * | 3/2003 | Espey | ........ | E05D 15/165 16/106 |
| 6,553,618 B2 * | 4/2003 | Whitley | ........ | E05D 15/165 16/107 |
| 6,729,380 B2 * | 5/2004 | Whitley | ........ | E05D 15/165 16/DIG. 6 |
| 7,614,707 B2 * | 11/2009 | Jabbour, Jr. | ........ | B60B 3/001 301/111.01 |
| 7,775,162 B1 * | 8/2010 | Cislo | ........ | B65G 39/20 105/154 |
| 9,062,485 B2 * | 6/2015 | Guidos | ........ | A47K 3/30 |
| 9,394,734 B1 * | 7/2016 | Berger | ........ | E05D 11/02 |
| 2007/0289091 A1 * | 12/2007 | Espey | ........ | E05D 15/165 49/420 |
| 2009/0272040 A1 * | 11/2009 | Chen | ........ | E05D 15/165 49/420 |
| 2014/0004985 A1 | 1/2014 | Lescorail et al. | | |
| 2016/0327146 A1 | 11/2016 | Lescorail et al. | | |
| 2018/0002961 A1 * | 1/2018 | Kelley | ........ | E05D 15/242 |

FOREIGN PATENT DOCUMENTS

| | | |
|---|---|---|
| DE | 20 2008 007 842 U1 | 10/2009 |
| DE | 10 2013 210 935 A1 | 1/2014 |
| EP | 0 336 802 A1 | 10/1989 |
| WO | 2012/107353 A1 | 8/2012 |

* cited by examiner

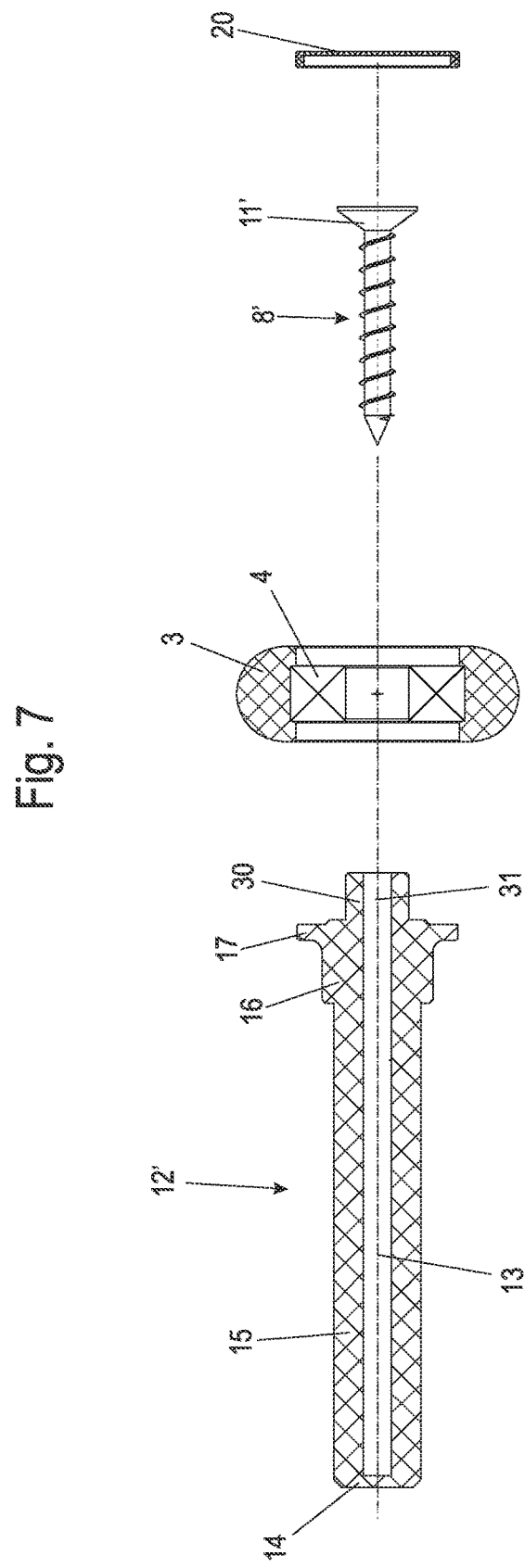

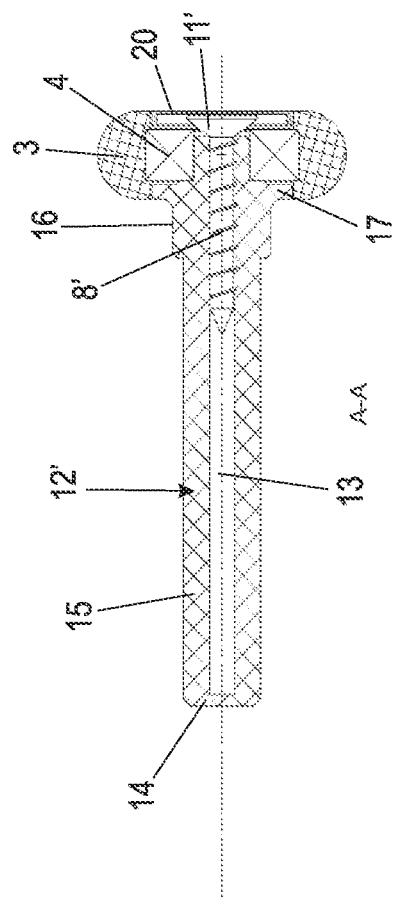
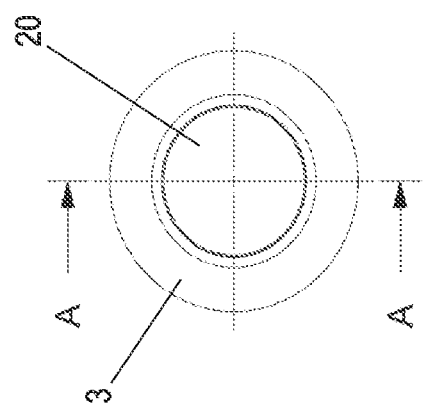

ROLLER FOR A ROLLER DOOR AND METHOD FOR MOUNTING A ROLLER

CROSS REFERENCE TO RELATED APPLICATIONS

Applicant claims priority under 35 U.S.C. § 119 of German Application No. 10 2016 125 512.2 filed on Dec. 22, 2016, the disclosure of which is incorporated by reference.

BACKGROUND OF THE INVENTION

The present invention relates to a roller for a roller door, having a roller bearing, which is surrounded on the outer circumference by a roller, and into which a bearing pin is inserted on the inner circumference, which protrudes in the axial direction from the roller bearing, wherein the bearing pin comprises an inner part made of a harder material and a bearing sleeve made of a softer material, and a method for mounting a roller for a roller door.

In the case of rollers for roller doors, it is known that metallic materials must be arranged in a protected manner to prevent corrosion. To this extent, a metallic pin is mostly encased in the injection-molding process, so that the outer surface of the roller is surrounded by a plastic sheath. The plastic sheath then forms a substantially sealed unit adjacent to a roller bearing with the roller. However, the production of such rollers is comparatively complex. In particular, the metallic pins must first be inserted into an injection molding tool, so that they can be encased. After the production of the encased component, the roller bearing and the roller still need to be mounted, so that a large number of steps is necessary.

SUMMARY OF THE INVENTION

It is therefore an object of the present invention to provide a roller for a roller door and a method for assembling such a roller which simplify the manufacturing process.

This object is achieved with a roller with having a roller bearing, which is surrounded on the outer circumference by a roller, and into which a bearing pin is inserted on the inner circumference, which protrudes in the axial direction from the roller bearing. The bearing pin comprises an inner part of a harder material and a bearing sleeve of a softer material. The inner part is pressed or screwed into the bearing sleeve. The invention also relates to a method comprising injection molding a bearing sleeve made of plastic, inserting and/or screwing an inner part into an inner ring of a roller bearing and the bearing sleeve, and fixing the inner part to the bearing sleeve in a force-locked manner, and applying a roller to an outer ring of the roller bearing.

In the roller according to the invention, an inner part of a harder material, in particular metal, is provided, which is pressed or screwed into a bearing sleeve, on which a roller bearing is provided with a roller. By pressing or screwing the inner part into the bearing sleeve they can be made independently from each other. In addition, the shape of the inner part made of metal can be optimally adapted to the respective application. The bearing sleeve is made of a softer material than the inner part, for example made of plastic.

Preferably, the inner part has a threaded portion on an outer circumference. The thread can then be twisted into the bearing sleeve made of plastic, so that a stable connection is present both in the radial direction and in the axial direction. For this purpose, the bearing sleeve may have a substantially cylindrical hollow chamber, in which the inner part is screwed in or is inserted. Inwardly protruding ribs may optionally be formed on the bearing sleeve, which ribs provide a particularly stable connection with an external thread of the inner part.

According to a preferred embodiment, a radially projecting head portion is formed integrally with the inner part, which head portion is arranged adjacent to an axial side surface on an inner ring of the roller bearing in the axial direction. This facilitates the assembly, since the inner part can be inserted in a single process step through the inner ring of the roller bearing and at the same time also the bearing sleeve made of plastic, wherein the roller bearing is secured between the head portion and the bearing sleeve.

For sealing an interior space on the roller, in which the roller bearing is arranged, the bearing sleeve can comprise a radially protruding ring, which extends to the roller and covers the roller bearing on a first side. The ring can form a gap seal with the roller, optionally also a labyrinth seal to avoid the ingress of moisture as far as possible. On an opposite side, a cover can be mounted on the roller, which rests in a sealed manner against the roller and is thus rotatable together with the roller to prevent ingress of moisture.

In a preferred embodiment, an inner ring of the roller bearing rests on the inner part, so that a particularly good concentricity of the roller is achieved. In this case, the inner part may have a cylindrical portion and a threaded portion, wherein the roller bearing is mounted on the cylindrical portion. The inner part can thus directly ensure a centering of the roller bearing, so that with precise formation of the inner part, which consists of a hard material, such as metal or a hard plastic, precise concentricity is ensured.

According to an alternative embodiment, the inner part is designed as a screw, which is completely turned into the bearing sleeve, apart from a screw head. In this case, the bearing sleeve can form a bearing portion on which an inner ring of the roller bearing is attached.

In the method according to the invention for mounting a roller, a bearing sleeve is made at first of plastic by injection molding. Subsequently, a metallic inner part is inserted or screwed into a ring of a roller bearing and the bearing sleeve, and the inner part is fixed in a force-locked manner to the bearing sleeve. As a result, both the roller bearing and also the bearing sleeve and the metallic part can be fixed together in one operation. In addition, a roller is applied to the outer ring of the roller bearing, wherein this process step can occur before the assembly of the inner part, after assembly or simultaneously.

BRIEF DESCRIPTION OF THE DRAWINGS

The invention will be explained in more detail below with reference to two embodiments shown in the accompanying drawings, wherein:

FIG. 7 shows a sectional exploded view of the roller of FIG. 5, and

FIGS. 8A and 8B show two views of the roller of FIG. 5 in a mounted position.

DETAILED DESCRIPTION OF THE EMBODIMENTS

A roller 1 comprises a bearing journal 2 and a roller 3 which is rotatable relative to the bearing journal 2 and which can be guided on a guide rail, for example on a roller door or a garage door.

Figure 1:
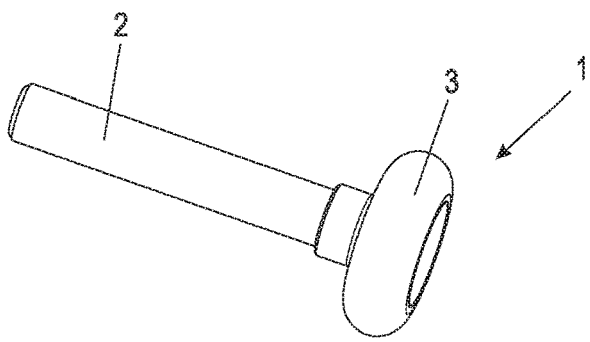
FIG. 1 shows a perspective view of a roller according to the invention.
Figure 2:
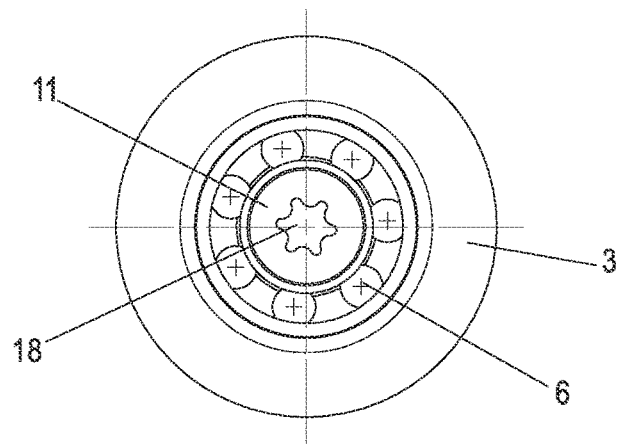
FIG. 2 shows a side view of the roller of FIG. 1.
Figure 3:
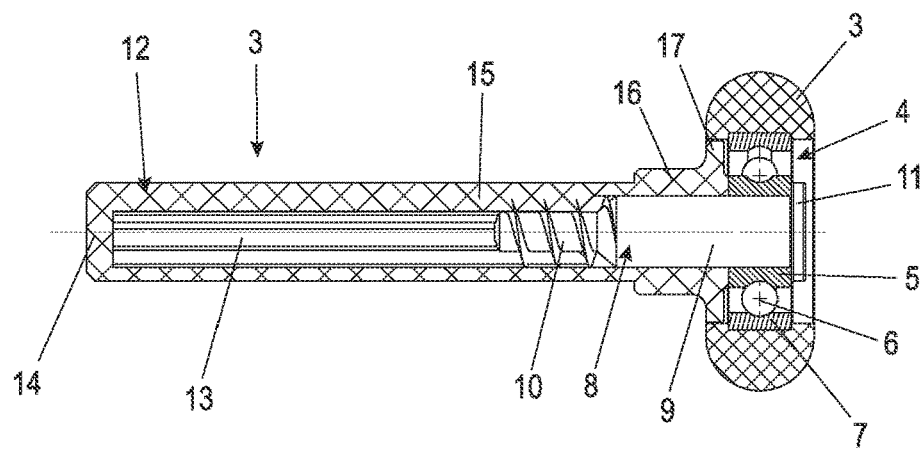
FIG. 3 shows a sectional view through the roller of FIG. 1.

As shown in FIGS. 2 and 3, a roller bearing 4 is located in the roller 3, which has an inner ring 5, spherical rolling elements 6 and an outer ring 7. Instead of the ball bearing shown, other roller bearings 4 can be used. On the outer ring 7, the annular roller 3 is arranged on the outer side, which may be made of an elastic material, especially plastic or rubber.

In the inner ring 5 of the roller bearing 4, an inner part 8 made of a hard material, such as metal, a reinforced plastic or a hard plastic, is inserted, which comprises a a cylindrical portion 9 and a threaded portion 10. The inner ring 5 of the roller bearing 4 rests against the cylindrical portion 9 on the outer circumference. The inner part 8 made of metal further comprises a head portion 11 which protrudes in the radial direction and at least partially covers an axial side surface on the inner ring 5. On the side opposite the head portion 11, a bearing sleeve 12 is provided of a softer material than the inner part, in particular made of plastic, which has a substantially cylindrical interior space 13 which is closed on the side facing away from the roller 3 by a bottom 14.

The inner part 8 is connected to the bearing sleeve 12 in a force-locked manner, wherein the threaded portion 10 of the inner part 8 is screwed into the bearing sleeve 12 and the threads have been cut into the material of the bearing sleeve 12. As a result, a stable connection is produced between the inner part 8 and the bearing sleeve 12 via the inner part 8, and at the same time the roller bearing 4 between the head portion 11 and the bearing sleeve 12 is axially secured. The bearing sleeve 12 includes a first portion 15 with lower diameter to which a second portion 16 adjoins with a larger diameter, on which other components, such as a connecting device for connecting a plurality of rollers 1 to a unit, can be arranged. A ring 17 protrudes radially on the portion 16, which extends as far as an inner circumferential surface of the roller 3 and covers the roller bearing 4 in the axial direction, so that this area is substantially sealed. The inner part 8 made of metal does not extend over the entire length of the bearing sleeve 12, but only over a part, wherein the inner part 8 of metal is more than 50% shorter than the bearing sleeve 12 in the axial direction. As a result, the roller 1 can be produced with low weight.

Figure 4:
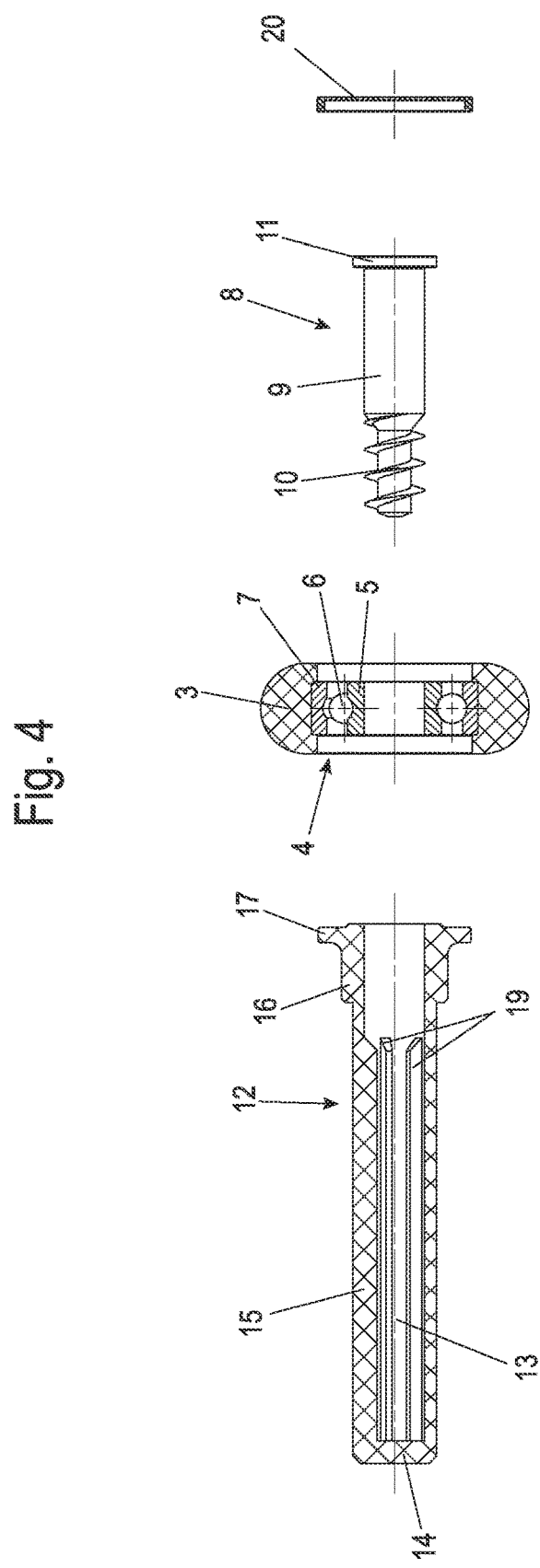
FIG. 4 shows a perspective sectional view of the roller of FIG. 3.
Figure 5:
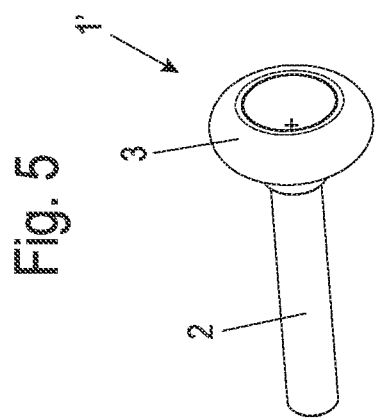
FIG. 5 shows a perspective view of a modified roller according to a second embodiment.
Figure 6:
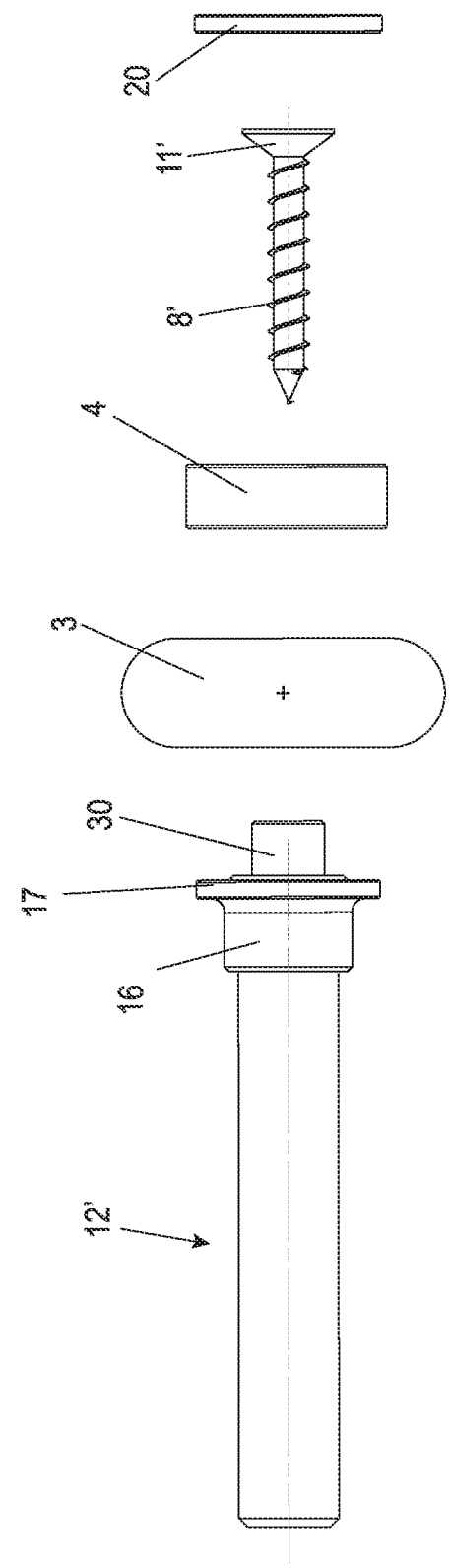
FIG. 6 shows an exploded view of the roller of FIG. 5.

In FIG. 4, the roller 1 is shown with the individual parts before assembly. On the roller bearing 4, the roller 3 has been fixed to the outer ring 7. The bearing sleeve 12 is made as an injection-molded part made of plastic and includes on the interior space 13 inwardly projecting ribs 19, which provide a better connection with the threaded portion 10 of the metallic part 8. It is also possible to optionally dispense with the ribs 19 or to design the inner contour on the bearing sleeve 12 differently. For assembly, the inner part 8 is inserted through the roller bearing 4 and then twisted with the threaded portion 10 into the bearing sleeve 12, so that in one step both the bearing sleeve 12 is connected to the inner part 8 and the roller 3 is mounted with the roller bearing 4 between the head portion 11 and the bearing sleeve 12. Subsequently, a cover 20 is mounted on the roller 3 to the side facing away from the bearing sleeve 12. In the metallic inner part 8, a tool holder 18 is formed on the head portion 11, which enables the engagement of a tool to fix the inner part 8 to the bearing sleeve 12 with a predetermined torque.

FIGS. 5 to 8 show a second exemplary embodiment of a roller 1' according to the invention, which is designed substantially like the roller 1 of the first embodiment, and the same reference numerals have been used for the same components.

In the roller 1', the metallic inner part 8' is formed as a screw which has a head portion 11' widening in the radial direction and is screwed into a fastening portion 31 of a bearing sleeve 12'. The bearing sleeve 12' is formed as in the previous embodiment with a cylindrical portion 15 with a smaller diameter, in which a cylindrical interior space 13 is provided, which is closed at one face end by a bottom 14. The cylindrical fastening portion 31 adjoins the cylindrical interior space 13. Furthermore, the bearing sleeve 12' has a cylindrical portion 16 of larger diameter, which is arranged adjacent to a radially protruding ring 17. In addition to the ring 17, a bearing portion 30 is disposed which is sleeve-shaped and is penetrated on the inner circumference by the inner part 8', and on the outer circumference of which an inner ring of the roller bearing 4 abuts, which is shown only schematically. In this respect, the roller bearing 4 does not rest against the metallic part 8', but against the bearing portion 30 of the bearing sleeve 12' which is made of plastic.

The assembly is similar to the first embodiment by producing the bearing sleeve 12' by injection molding and mounting the roller bearing 4 with the inner part 8' in one operation, wherein the inner part 8' is formed as a screw and is screwed by a tool into the fastening portion 31 of the bearing sleeve 12' until the head portion 11' abuts an axial side surface of the inner ring of the roller bearing 4, so that the roller bearing 4' is held between the head portion 11' and a side surface of the ring 17. On the roller bearing 4, the roller 3 was preferably mounted prior to assembly, but optionally also at the same time or thereafter. Furthermore, a side cover 20 is then fixed to the roller 3, which is rotatable together with the roller 3, so that the roller bearing 4 is located in a protected interior space.

In the illustrated embodiments, the inner part 8 and 8' each have a threaded portion in order to screw said portion into a receiver on the bearing sleeve 12 or 12'. It is also possible, instead of a screw connection, to provide a clamping connection by inserting an inner part 8' into the bearing sleeve, e.g. with a corresponding clamping profile on the inner part 8 and/or the bearing sleeve 12. The length of the inner part 8 or 8' is preferably less than 40% of the length of the bearing sleeve 12, 12', so that the use of material compared to a solution in which the inner part of metal has substantially the same length as the bearing sleeve, is considerably reduced. Optionally, the cavity in the bearing sleeve 12 or 12' can also be filled, or the bearing sleeve 12 or 12' can be made shorter.

LIST OF REFERENCE NUMERALS 1, 1' Roller
2 Bearing pin
3 Roller
4, 4' Roller bearing
5 Ring
6 Rolling element
7 Ring
8, 8' Inner part
9 Portion
10 Threaded portion 11, 11' Head portion
12, 12' Bearing sleeve
13 Interior space
14 Bottom
15 Portion
16 Portion
17 Ring
18 Tool holder
19 Rib
20 Cover
30 Bearing portion
31 Fastening portion

What is claimed is:

1. A roller for a roller door, comprising:
    a roller bearing;
    a roller surrounding an outer circumference of the roller bearing;
    a bearing pin inserted into an inner circumference of the roller bearing, said bearing pin protruding in an axial direction from the roller bearing,
    wherein the bearing pin comprises a metallic inner part having a radially projecting cylindrical head portion, and a bearing sleeve of a softer material than the inner part, and wherein the inner part is pressed or screwed into the bearing sleeve,
    wherein the cylindrical head portion is integrally formed with the inner part, which head portion is arranged adjacent to an axial side surface of an inner ring of the roller bearing in an axial direction, and wherein the inner ring of the rolling bearing is arranged on the cylindrical head portion of the inner part.

2. The roller according to claim 1, wherein the inner part has a threaded portion on an outer circumference.

3. The roller according to claim 1, wherein a substantially cylindrical hollow chamber is formed in the bearing sleeve, into which chamber the inner part is screwed or inserted.

4. The roller according to claim 1, wherein the inner part is formed at least 20% shorter in an axial direction than the bearing sleeve.

5. The roller according to claim 4, wherein the inner part is formed at least 40% shorter in the axial direction than the bearing sleeve.

6. The roller according to claim 1, wherein the bearing sleeve has a radially protruding ring which extends to the roller and covers the roller bearing on a first side.

7. The roller according to claim 1, wherein the inner part has a threaded portion.

8. The roller according to claim 1, wherein the inner part is formed by a screw which apart from a screw head is completely screwed into the bearing sleeve.

9. The roller according to claim 8, wherein the bearing sleeve forms a bearing portion on which an inner ring of the roller bearing is attached.

10. A method for assembling a rolling shutter roller, comprising the following steps:
    injection molding a bearing sleeve made of plastic;
    inserting and/or screwing an inner part made of metal and having a radially projecting cylindrical head portion into an inner ring of a roller bearing and the bearing sleeve so that the cylindrical head portion is arranged adjacent to an axial side surface the inner ring in an axial direction and the inner ring is arranged on the cylindrical head portion, and fixing the inner part to the bearing sleeve in a force-locked manner, and
    applying a roller to an outer ring of the roller bearing.

* * * * *